US007295902B2

(12) United States Patent
Chen et al.

(10) Patent No.: US 7,295,902 B2
(45) Date of Patent: Nov. 13, 2007

(54) TORQUE MANAGEMENT ALGORITHM FOR HYBRID ELECTRIC VEHICLES

(75) Inventors: Jyh-Shin Chen, Troy, MI (US); Mutasim A. Salman, Rochester Hills, MI (US); Man-Feng Chang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 549 days.

(21) Appl. No.: 10/836,799

(22) Filed: Apr. 30, 2004

(65) Prior Publication Data

US 2005/0246076 A1    Nov. 3, 2005

(51) Int. Cl.
*B60K 1/04* (2006.01)
(52) U.S. Cl. ..................... 701/22; 180/65.1
(58) Field of Classification Search ............... 701/22; 180/65.1, 65.3, 69.4; 290/40 A, 40 B, 40 C, 290/40 R, 38 R, 45, 46; 318/8, 9, 34, 51, 318/52
See application file for complete search history.

(56) References Cited

U.S. PATENT DOCUMENTS 5,936,312 A * 8/1999 Koide et al. .............. 290/40 R
6,356,817 B1 * 3/2002 Abe ............................ 701/22
6,449,537 B1 * 9/2002 Phillips et al. ................ 701/22
6,480,767 B2 * 11/2002 Yamaguchi et al. .......... 701/22
6,561,296 B2   5/2003 Obayashi ................... 180/65.2
6,741,917 B2   5/2004 Tomikawa .................... 701/22
6,827,167 B2 * 12/2004 Cikanek et al. ............ 180/65.6

OTHER PUBLICATIONS

International Search Report for PCT/US05/09623 dated May 24, 2007 corresponding to this application.

* cited by examiner

*Primary Examiner*—Dalena Tran

(57) ABSTRACT

A system and method for determining a commanded engine and motor torque to minimize fuel consumption and manage battery state of charge in a hybrid electric vehicle. The method includes determining a penalty factor value that dictates the usage of the battery. A cost value is determined for every feasible engine torque for a selected or demanded vehicle torque and speed request. Each cost value is determined by a fuel consumption value, a change in the battery state of charge and the penalty factor value. The change in the battery state of charge is determined from the motor power and a nominal battery state of charge. For a specific penalty factor, a look-up table for optimal engine torque is generated for different requested vehicle torques at various vehicle speeds. A separate look-up table is provided for each penalty factor.

33 Claims, 3 Drawing Sheets

TORQUE MANAGEMENT ALGORITHM FOR HYBRID ELECTRIC VEHICLES

BACKGROUND OF THE INVENTION

1. Field of the Invention

This invention relates generally to a system and method for managing the commanded engine torque and motor torque for a hybrid electric vehicle and, more particularly, to a system and method for determining the commanded engine torque and motor torque that minimizes fuel consumption and manages battery state of charge in a hybrid electric vehicle.

2. Discussion of the Related Art

Hybrid electric vehicles use an engine and one or more electric motors to propel the vehicle to achieve better fuel economy and lower emissions than conventional vehicles. The engine output power does not have to equate power demands as in conventional vehicles. Generally the engine is used at high load demands and the motor is used at low load demands. A combination of both engine power and electric motor power can also be provided for increased performance purposes. The electric motor supplements the power from the engine when the engine cannot efficiently cope with the current power demands. The motor can absorb the engine power and store it in a motor battery for later use. The engine can also be used to recharge the battery during prolonged use of the motor.

The battery state of charge (SOC) is an important consideration when determining if the motor should be used because a battery is more efficient if the battery state of charge is between an upper bound battery charge and a lower bound battery charge. The battery also needs to be self-sustaining. Therefore, it is desirable to try and maintain the battery state of charge at or near a nominal value.

Known hybrid electric vehicles can be improved by better determining when to use engine power, electric power or a combination of both to increase the fuel economy and lower the vehicle emissions.

SUMMARY OF THE INVENTION

In accordance with the teachings of the present invention, a system and method are disclosed for determining a commanded engine torque and motor torque to minimize fuel consumption and to manage battery state of charge in a hybrid electric vehicle. The method includes determining a penalty factor value that influences battery usage. A cost value is determined for every feasible engine torque for a selected or demanded vehicle torque and speed request. Each cost value is determined by a fuel consumption value, a change in the battery state of charge and the penalty factor value. The fuel consumption value is determined from the engine shaft torque and the engine shaft speed for the predetermined engine torque and vehicle speed request. The change in the battery state of charge is determined from the motor input power, which is determined from the motor torque, the vehicle speed, and a nominal battery state of charge. A look-up table for the optimal engine torques is generated for each vehicle torque and speed request. A separate look-up table is provided for each penalty factor.

The penalty factor is adapted for different driving conditions. The battery state of charge is maintained between an upper bound state of charge limit and a lower bound state of charge limit, where the nominal battery charge is between the upper bound and the lower bound. If the battery state of charge reaches the upper bound, then the penalty factor value is set to a predetermined upper bound penalty factor value that will cause the motor to be used more so that the battery state of charge returns to the nominal value. Likewise, if the battery state of charge reaches the lower bound, then the penalty factor value is set to a predetermined lower bound penalty factor value that reduces the motor use so that the battery state of charge returns to the nominal value.

Additional advantages and features of the present invention will become apparent from the following description and appended claims, taken in conjunction with the accompanying drawings.

DETAILED DISCUSSION OF THE EMBODIMENTS

Figure 1:
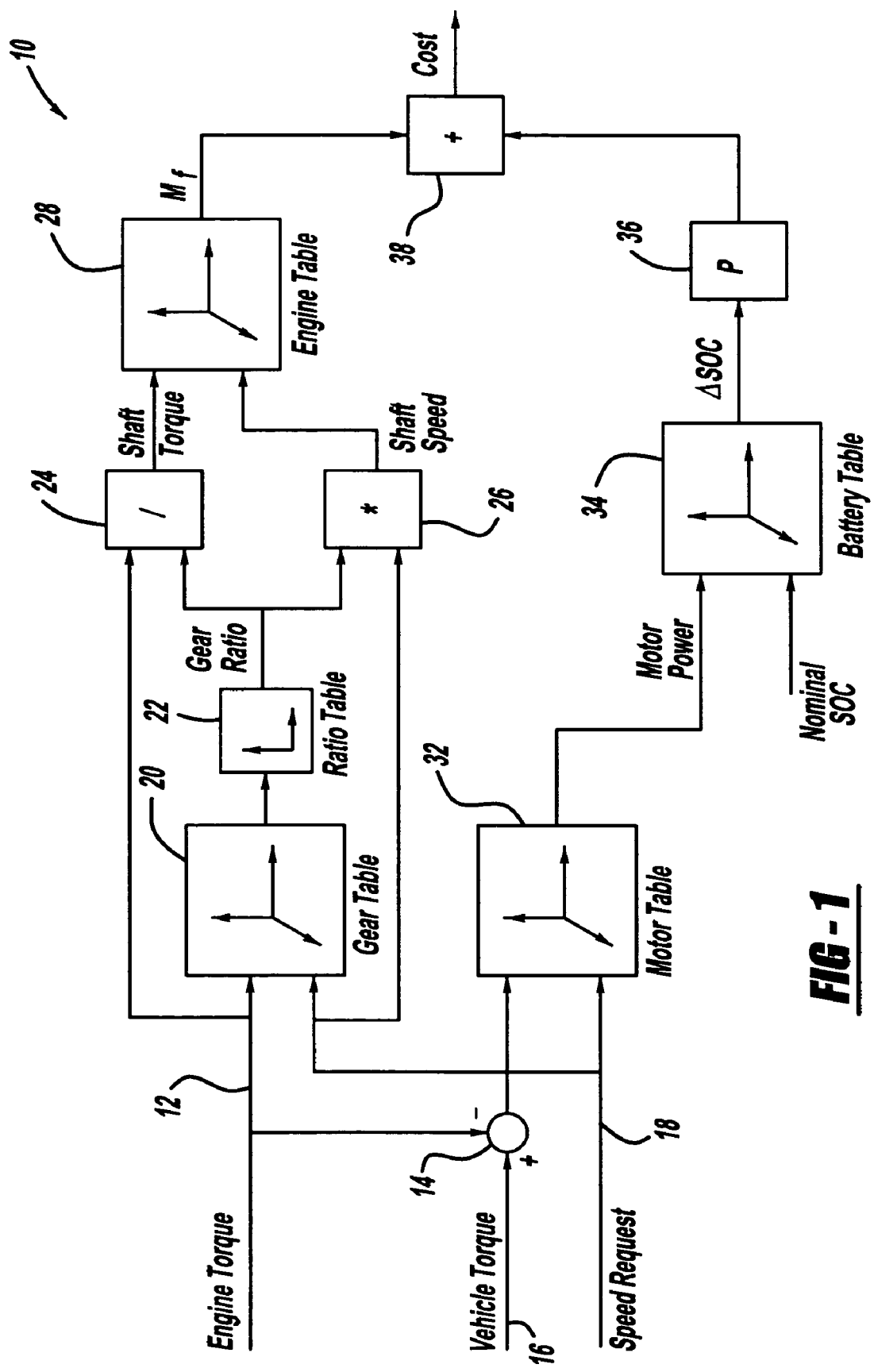
FIG. 1 is a block diagram showing a calculation process for determining the cost value for a specific commanded engine and motor torque combination, according to an embodiment of the present invention.

The following discussion of the embodiments of the invention directed to a system and method for determining a commanded engine and motor torque to minimize fuel consumption and manage battery state of charge in a hybrid vehicle is merely exemplary in nature and is in no way intended to limit the invention or its applications or uses.

The present invention includes an algorithm for determining the commanded engine torque and motor torque for minimizing fuel consumption and managing battery state of charge in a hybrid electric vehicle. Proper engine and motor torque commands are necessary for good fuel economy. As will be discussed in detail below, the algorithm uses a cost function $J_e$ that combines fuel consumption $M_f$ and the change of the battery state of charge $\Delta SOC$ through a penalty factor p to find the optimal commanded engine torque.

$$J_e = M_f + p \cdot \Delta SOC \qquad (1)$$

The penalty factor p affects the torque allocation between the engine and the motor. An adaptation calculation scheme automatically adjusts the penalty factor p for different driving conditions.

At a specific vehicle torque and speed request, different engine torques result in different fuel consumptions and changes in the state of charge of the battery. In other words, for each torque request made by a vehicle operator, different combinations of the torque provided by the engine and the torque provided by the motor will provide that request. For each different engine torque and motor torque, a different fuel consumption $M_f$ and change in the battery state of charge $\Delta SOC$ will occur. Using equation (1), the cost values can be calculated for the various combinations of engine torque and motor torque for a given penalty factor p. The combination that yields the lowest cost value will be used for that request at that penalty factor p.

It is important to note that the motor in a hybrid electric vehicle supplies the balance between the engine and the request torques. Further, the terminology "motor torque" as used herein includes both a positive motor torque (motor) and a negative motor torque (generator), where the positive motor torque drives the vehicle and the negative motor torque charges the battery.

The change of the battery state of charge is negative when the battery is being used to propel the vehicle. Therefore, the penalty factor p must be a negative number to penalize the use of the battery energy. Note that the penalty factor p raises the cost value $J_e$ beyond the fuel consumption $M_f$ when energy is taken from the battery to propel the vehicle.

The optimal engine torque commands for all requested torques and speeds are determined "offline", i.e., before operation of the vehicle, and then provided in a look-up table for each separate penalty factor p, which can then be used by the engine controller in the hybrid vehicle. Thus, when the vehicle operator requests a particular vehicle torque and speed, the look-up table will give the correct combination of engine power and electric motor power that would provide the lowest cost value for the current penalty factor p.

FIG. 1 is a block diagram of a system 10 for calculating the cost value $J_e$, according to the invention. A requested vehicle torque is provided on line 16 and the vehicle wheel speed is provided on line 18. An engine torque at the wheel is arbitrarily selected and provided on line 12. The vehicle torque is the combination of the engine torque and motor torque at the vehicle wheel. The engine torque on the line 12 and the vehicle speed on the line 18 are applied to a gear look-up table 20 that selects a suitable gear number for the engine torque and vehicle speed. The selected gear number for the engine torque and vehicle speed provides a gear ratio signal from a gear look-up ratio table 22. The gear ratio signal and the engine torque signal on the line 12 are divided by a divider 24 to generate a shaft torque at the output of the vehicle engine. The vehicle speed signal on the line 18 and the gear ratio signal are multiplied by a multiplier 26 to generate an engine shaft speed signal. The engine shaft torque signal and the engine shaft speed signal are then sent to an engine look-up table 28 that determines the fuel consumption $M_f$ per unit time, such as one second, at that engine shaft torque and engine shaft speed.

The engine torque on the line 12 and the requested vehicle torque on the line 16 are subtracted from each other in an adder 14 to provide the motor torque at the wheel. The motor torque at the wheel and the vehicle speed are applied to a motor look-up table 32. The motor table 32 generates the required motor input power to provide the motor torque that is applied to a battery look-up table 34. A nominal state of charge of the battery is also applied to the battery table 34 as a predetermined desired operating charge for the battery. The battery table 34 outputs a change of the battery state of charge per unit time, such as one second. This change in the battery state of charge is multiplied by the current penalty factor p in a multiplier 36. The multiplied value is then added to the fuel consumption value $M_f$ in an adder 38 to generate the cost value $J_e$ as in equation (1). By providing all of the possible engine torques for each selected vehicle torque and vehicle speed, a separate look-up table for each penalty factor p can be generated for later use by the hybrid vehicle engine controller.

Figure 2:
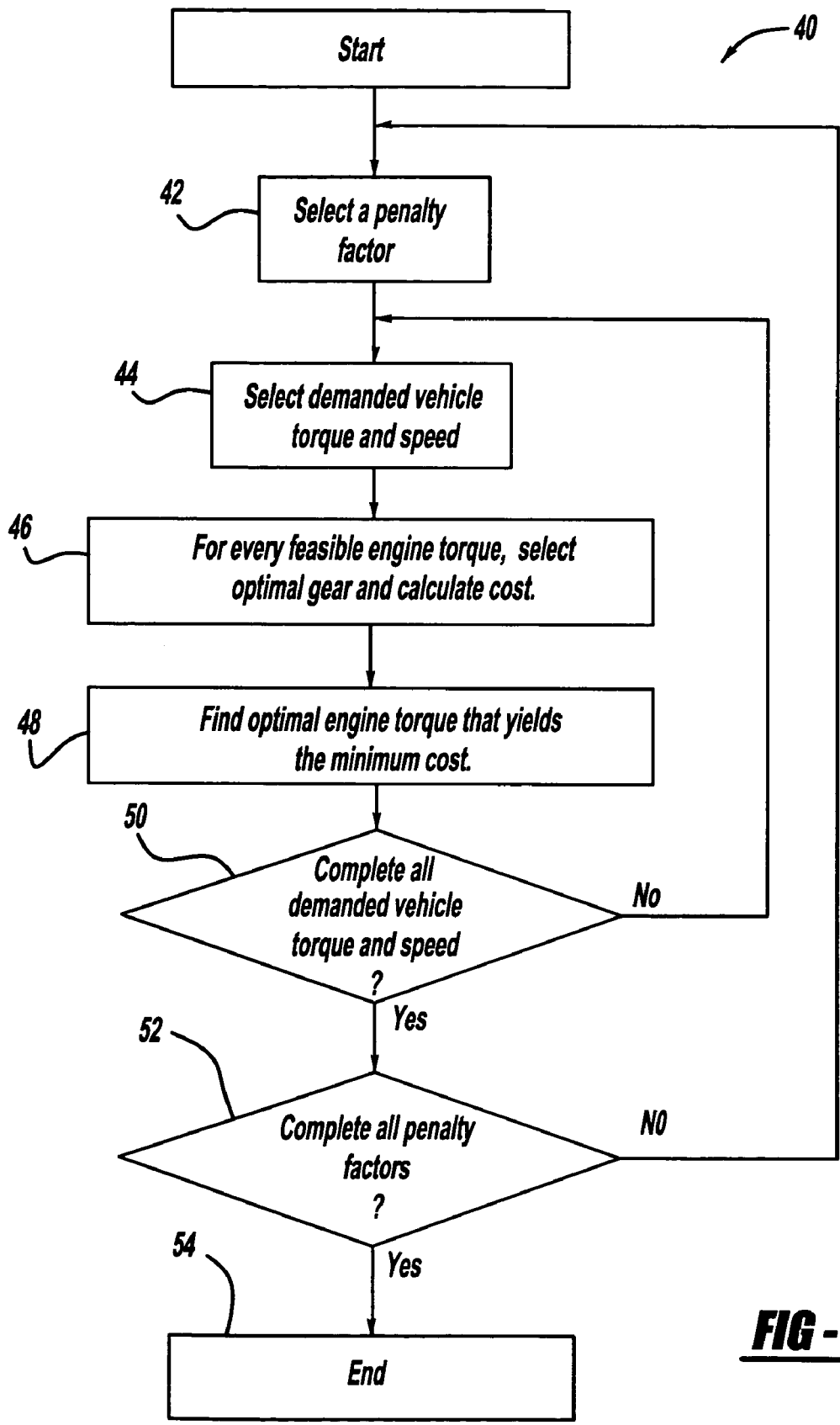
FIG. 2 is a flow chart diagram for building look-up tables for the optimal commanded engine torque for several penalty factors, according to an embodiment of the present invention.

FIG. 2 is a flow chart diagram 40 showing the process to build the look-up tables for various penalty factors p. The algorithm first selects a penalty factor p at box 42. The process for determining or adapting the penalty factor p will be discussed below with reference to FIG. 3. The algorithm then selects a demanded or requested vehicle torque and vehicle speed at box 44. For every feasible engine torque for the requested vehicle torque and speed, the algorithm selects an optimal gear and calculates the cost value $J_e$ at box 46. The algorithm then determines the optimal engine torque from the several feasible engine torques that yields the minimum cost value $J_e$ at box 48.

The algorithm then determines if the cost value $J_e$ has been calculated for all selected vehicle torques and speeds at decision diamond 50. If all of the cost values $J_e$ have not been calculated, the algorithm returns to the box 44 to select another demanded vehicle torque and speed to calculate those cost values $J_e$ that have not been calculated. If all of the cost values $J_e$ have been calculated, the algorithm then determines if all of the cost values $J_e$ for all of the penalty factors p have been determined for all of the requested vehicles torques and speeds at decision diamond 52. If all of the cost values $J_e$ for all of the penalty factors p have not been determined, the algorithm returns to the box 42 to select another penalty factor p for a demanded vehicle torque and speed. If all of the cost values $J_e$ and the penalty factors p have been determined, then the algorithm ends at box 54.

Different penalty factors p are required for different driving conditions to sustain the battery state of charge. Adjusting the penalty factor p alters the demand for battery power. Particularly, the penalty factor p determines how much the motor will be used. The larger the absolute value of the penalty factor p, the more the penalty for using the motor, which will use less battery power. To increase the battery state of charge, the absolute value of the penalty factor p is increased. Similarly, to decrease the battery state of charge, the absolute value of the penalty factor p is decreased. Therefore, a larger penalty factor p will cause the vehicle to use the engine more, and a smaller penalty factor p will cause the vehicle to use the motor more.

As mentioned above, it is desirable to maintain the battery state of charge within a certain charge region around a nominal battery state of charge. This charge region is defined by a lower bound, i.e., minimal battery state of charge, and an upper bound, i.e., a maximum battery state charge for a particular battery type. The battery nominal value is about halfway between the lower bound and the upper bound. If the battery state of charge reaches the lower bound, the algorithm automatically sets the penalty factor p equal to a predetermined p1 value. Likewise, if the battery state of charge reaches the upper bound, the algorithm automatically sets the penalty factor p to a predetermined p2 value. The penalty factors p1 and p2 are negative numbers, and the absolute value of p1 is greater than the absolute value of p2. By setting the penalty factor p equal to p1 or p2, the battery state of charge will be guaranteed to move away from the lower bound or the upper bound, respectively, towards the nominal battery state of charge. If the algorithm sets the penalty factor p to p1 or p2, the previous old penalty factor p value is stored for later use.

The penalty factor p is adapted in the following manner. When the battery state of charge exceeds the upper bound, the current value of the penalty factor p is stored, and the penalty factor p is changed to the predetermined value p2 having a small absolute value to bring the battery state of charge to the nominal value. Once the battery state of charge reaches the nominal value, the penalty factor p is set to the stored penalty factor value plus a predetermined positive correction number. The new penalty factor p will encourage the use of the battery energy because its absolute value is slightly smaller. It is important to remember that the penalty factor p is a negative number. If the penalty factor p is still too negative, the battery state of charge will again exceed the upper bound. The penalty factor p will again be adjusted and the process will be repeated.

A similar process is used when the battery state of charge falls below the lower bound. However, a different predetermined value p1 with a large absolute value is used to bring the battery state of charge back to the nominal value. The penalty factor p is adjusted to the stored value minus a predetermined positive correction number.

Figure 3:
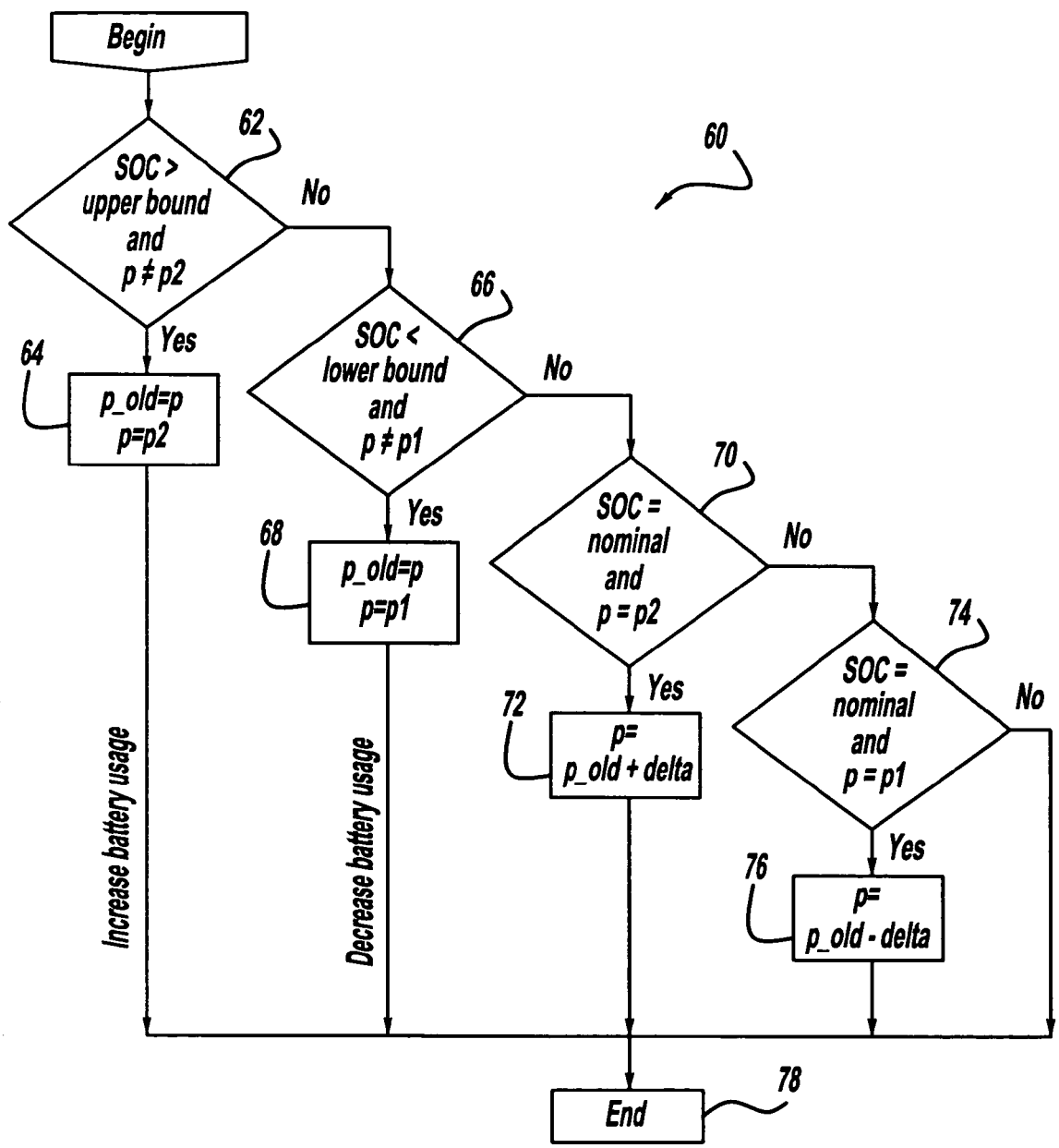
FIG. 3 is a flow chart diagram showing an adaptation process for determining a penalty factor for managing the battery state of charge, according to an embodiment of the present invention.

FIG. 3 is a flow chart diagram 60 for an algorithm that automatically adapts the penalty factor p for different driving conditions while the vehicle is being operated. A best guess initial penalty factor p is used to start the adaptation process. The algorithm determines if the battery state of charge is greater than the upper bound and whether the penalty factor p is not equal to p2 at decision diamond 62. If the battery state of charge is greater than the upper bound and p is not equal to p2, then the algorithm sets p equal to p2 and stores the previous penalty factor p at box 64. Thus, if the battery state of charge is greater than the upper bound, the penalty factor p2 provides an increase in battery usage.

If the battery state of charge is not greater than the upper bound, then the algorithm determines whether the battery state of charge is less than the lower bound and whether the penalty factor p is not equal to p1 at decision diamond 66. If the battery state of charge is less than the lower bound and p is not equal to p1, then the algorithm sets p equal to p1 at box 68 and stores the old penalty factor p. Thus, if the battery state of charge is less than the lower bound, the penalty factor p1 provides a decrease in battery usage.

If the battery state of charge is not greater than the upper bound and not lower than the lower bound, then the algorithm determines whether the battery state of charge equals a nominal value and p equals p2 at decision diamond 70. At this point, the algorithm determines if the battery state of charge has reached the nominal value after the algorithm has set the penalty factor p equal to p2 when the battery state of charge reaches the upper bound. If the battery state of charge is equal to the nominal value and the penalty factor p does equal p2, then p is set to the stored penalty factor p plus a small predetermined delta value increase at box 72.

If the battery state of charge is not greater than the upper bound, is not less than the lower bound, the penalty factor p does not equal p2, then the algorithm determines whether the battery state of charge equals the nominal value and p is equal to p1 at decision diamond 74. This is where the algorithm determines if the battery state of charge has reached the nominal value after the algorithm has set the penalty factor to p1 when the battery state of charge reaches the lower bound. If the battery state of charge is equal to the nominal value and the penalty factor p is equal to p1, then p is set to the stored penalty factor p minus a small predetermined delta value at box 76.

The penalty factor p is adjusted or adapted in this manner during operation of the vehicle. Several look-up tables are provided for various penalty factors p to determine the optimal engine torque. If the adapted penalty factor p is not provided in a look-up table, then the penalty factor p is interpolated between the closest look-up tables.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing torque management in a hybrid electric vehicle, said hybrid electric vehicle including an engine, an electric motor and a battery, said method comprising:
   determining a penalty factor value that influences the usage of the battery and affects a torque allocation between the engine and the motor;
   providing a requested vehicle torque value and a vehicle speed value;
   selecting an engine torque value;
   determining a fuel consumption value based on the engine torque value and the vehicle speed value;
   determining a change in the battery state of charge value based on a motor torque value and the vehicle speed value; and
   determining an optimal engine torque command from cost values based on the fuel consumption value, the change in the battery state of charge value and the penalty factor value.

2. The method according to claim 1 wherein determining an optimal engine torque command includes determining the cost values by multiplying the penalty factor value by the change in the battery state of charge value and adding the fuel consumption value to the multiplied change in the battery state of charge value and the penalty factor value.

3. The method according to claim 1 wherein determining the fuel consumption value includes determining a gear number based on the engine torque value and the vehicle speed value, determining a gear ratio value based on the determined gear number, dividing the engine torque value by the gear ratio value to generate an engine shaft torque value, multiplying the vehicle speed value by the gear ratio value to generate an engine shaft speed value, and determining the fuel consumption value based on the shaft torque value and the shaft speed value.

4. The method according to claim 3 wherein the gear number is determined by a gear number look-up table, the gear ratio is determined by a gear ratio look-up table and the fuel consumption value is determined by an engine look-up table.

5. The method according to claim 1 wherein determining a change in the battery state of charge value includes determining a motor input power value based on the motor torque value and the vehicle speed value, and determining the change in the battery state of charge based on the motor input power value and a nominal state of charge value.

6. The method according to claim 5 wherein determining the motor input power value includes using a motor look-up table and determining the change in the battery state of charge value includes using a battery look-up table.

7. The method according to claim 1 wherein determining an optimal engine torque command includes determining an optimal engine torque command from the cost values for every feasible engine torque value for a plurality of requested vehicle torque values and vehicle speed values for a penalty factor value.

8. The method according to claim 7 wherein each optimal engine torque command is added to an engine torque look-up table, wherein a plurality of the engine torque look-up tables are provided for a plurality of different penalty factor values.

9. The method according to claim 1 wherein determining an optimal engine torque command includes determining the optimal engine torque command offline.

10. The method according to claim 1 wherein determining the penalty factor value includes determining an upper bound battery charge limit, a lower bound battery charge limit and a nominal battery charge therebetween, and setting the penalty factor value to a first predetermined value if the battery state of charge value reaches the upper bound limit to increase electric motor use and setting the penalty factor value to a second predetermined penalty factor value if the battery state of charge value reaches the lower bound limit to decrease electric motor use.

11. The method according to claim 1 wherein determining a penalty factor value includes determining if the battery state of charge value has reached a predetermined upper bound battery state of charge value, determining whether the penalty factor value is equal to a predetermined penalty factor value, setting the penalty factor value equal to the predetermined penalty factor value and storing an old penalty factor value if the battery state of charge value has reached the upper bound value and the penalty factor value does not equal the predetermined penalty factor value.

12. The method according to claim 11 wherein determining a penalty factor value includes determining whether the battery state of charge value is about equal to a nominal battery state of charge value, determining whether the penalty factor value is equal to the predetermined penalty factor value, and setting the penalty factor value equal to the stored penalty factor value plus a small correction value if the battery state of charge value is about equal to the nominal battery state of charge value and the penalty factor value is equal to the predetermined penalty factor value.

13. The method according to claim 1 wherein determining a penalty factor value includes determining whether the battery state of charge value has reached a predetermined lower bound battery state of charge value, determining whether the penalty factor value equals a predetermined penalty factor value, and storing an old penalty factor value and setting the penalty factor value equal to the predetermined penalty factor value if the battery state of charge value has reached the lower bound value and the penalty factor value does not equal the predetermined penalty factor value.

14. The method according to claim 13 wherein determining a penalty factor value includes determining whether the battery state of charge value is about equal to a nominal battery state of charge value, whether the penalty factor value is equal to the predetermined penalty factor value, and setting the penalty factor value equal to the stored penalty factor value less a small correction value if the battery state of charge value is about the nominal battery state of charge value and the penalty factor value is equal to the predetermined penalty factor value.

15. The method according to claim 1 wherein the penalty factor value is a negative number.

16. A method for providing torque management in a hybrid electric vehicle, said hybrid electric vehicle including an engine, an electric motor and a battery, said method comprising:

determining a penalty factor value that influences the usage of the battery, wherein determining the penalty factor value includes determining an upper bound battery charge limit, a lower bound battery charge limit and a nominal battery charge therebetween, and setting the penalty factor value to a first predetermined value if the battery state of charge value reaches the upper bound limit to increase electric motor use and setting the penalty factor value to a second predetermined penalty factor value if the battery state of charge value reaches the lower bound limit to decrease electric motor use;

providing a requested vehicle torque value and a vehicle speed value;

selecting an engine torque value;

determining a fuel consumption value based on the engine torque value and the vehicle speed value;

determining a change in the battery state of charge value based on a motor torque value and the vehicle speed value; and determining an optimal engine torque command from cost values determined by multiplying the change in the battery state of charge value and the penalty factor value and adding the fuel consumption value to the multiplied change in the battery state of charge value and the penalty factor value, wherein determining an optimal engine torque command includes determining an optimal engine torque command from the cost values for every feasible engine torque value for a plurality of requested vehicle torque values and vehicle speed values for a penalty factor value.

17. The method according to claim 16 wherein determining the fuel consumption value includes determining a gear number based on the engine torque value and the vehicle speed value, determining a gear ratio value based on the determined gear number, dividing the engine torque value by the gear ratio value to generate an engine shaft torque value, multiplying the vehicle speed value by the gear ratio value to generate an engine shaft speed value, and determining the fuel consumption value based on the shaft torque value and the shaft speed value.

18. The method according to claim 17 wherein the gear number is determined by a gear number look-up table, the gear ratio is determined by a gear ratio look-up table and the fuel consumption value is determined by an engine look-up table.

19. The method according to claim 16 wherein determining a change in the battery state of charge value includes determining a motor input power value based on the motor torque value and the vehicle speed value, and determining the change in the battery state of charge based on the motor input power value and a nominal state of charge value.

20. The method according to claim 19 wherein determining the motor input power value includes using a motor look-up table and determining the change in the battery state of charge value includes using a battery look-up table.

21. The method according to claim 16 wherein each optimal engine torque command is added to an engine torque look-up table, wherein a plurality of the engine torque look-up tables are provided for a plurality of different penalty factor values.

22. The method according to claim 16 wherein determining an optimal engine torque command includes determining the optimal engine torque command offline.

23. An apparatus for providing torque management in a hybrid electric vehicle, said hybrid electric vehicle including an engine, an electric motor and a battery, said apparatus comprising:

a penalty factor system for providing a penalty factor value that influences the usage of the battery and affects a torque allocation between the engine and the motor;

a fuel consumption system for determining a fuel consumption value based on a predetermined engine torque value and a requested vehicle speed value;

a battery state of charge system for determining a change in the state of charge of the battery value based on a motor torque value and the vehicle speed value; and a cost function system for determining an optimal engine torque command from cost values calculated from the fuel consumption value, the change in the battery state of charge value and the penalty factor value.

24. The apparatus according to claim 23 wherein the cost function system multiplies the penalty factor value by the change in the battery state of charge value and adds the fuel consumption value to the multiplied change in the battery state of charge value and the penalty factor value.

25. The apparatus according to claim 23 wherein the fuel consumption system includes a gear number look-up table for determining a gear number based on the engine torque value and the vehicle speed value, a gear ratio table for determining a gear ratio value of the gear number, a divider for dividing the engine torque value by the gear ratio value to generate an engine shaft torque value, a multiplier for multiplying the vehicle speed value by the gear ratio value to generate an engine shaft speed value, said fuel consumption system determining the fuel consumption value based on the shaft torque value and the shaft speed value.

26. The apparatus according to claim 23 wherein the battery state of charge system includes a motor look-up table for determining a motor input power value based the motor torque value and the vehicle speed value, and a battery look-up table for determining the change in the battery state of charge value based on the motor input power value and a nominal state of charge value.

27. The apparatus according to claim 23 wherein the cost function system determines an optimal engine torque command from the cost values for every feasible engine torque value for a plurality of requested vehicle torque values and vehicle speed values for a penalty factor value.

28. The apparatus according to claim 23 wherein the cost function system includes a plurality of engine torque look-up tables for an optimal engine torque command for a particular penalty factor value.

29. The apparatus according to claim 23 wherein the penalty factor system determines the penalty factor value by determining an upper bound battery charge limit, a lower bound battery charge limit and a nominal battery charge therebetween, said penalty factor system setting the penalty factor value to a first predetermined value if the battery state of charge value reaches the upper bound limit to increase electric motor use and sets the penalty factor value to a second predetermined penalty factor value if the battery state of charge value reaches a lower bound limit to decrease electric motor use.

30. The apparatus according to claim 23 wherein the penalty factor system determines if the battery state of charge value has reached a predetermined upper bound battery state of charge value, determines whether the penalty factor value is equal to a predetermined penalty factor value, sets the penalty factor value equal to the predetermined penalty factor value and stores an old penalty factor value if the battery state of charge value has reached the upper bound value and the penalty factor value does not equal the predetermined penalty factor value.

31. The apparatus according to claim 30 wherein the penalty factor system determines whether the battery state of charge value is about equal to a nominal battery state of charge, determines whether the penalty factor value is equal to the predetermined penalty factor value, and sets the penalty factor value equal to the stored penalty factor value plus a small correction value if the battery state of charge value is about equal to the nominal battery state of charge value and the penalty factor value is equal to the predetermined penalty factor value.

32. The apparatus according to claim 23 wherein the penalty factor system determines whether the battery state of charge value has reached a predetermined lower bound battery state of charge value, determines whether the penalty factor value equals a predetermined penalty factor value, and stores an old penalty factor value and sets the penalty factor value equal to the predetermined penalty factor value if the battery state of charge has reached the lower bound value and the penalty factor value does not equal the predetermined penalty factor value.

33. The apparatus according to claim 32 wherein the penalty factor system determines whether the battery state of charge value is about equal to a nominal battery state of charge value, whether the penalty factor value is equal to the predetermined penalty factor value, and sets the penalty factor value equal to the stored penalty factor value less a small correction value if the battery state of charge value is about the nominal battery state of charge value and the penalty factor value is equal to the predetermined penalty factor value.

* * * * *